(12) United States Patent
Hassan et al.

(10) Patent No.: US 7,749,481 B2
(45) Date of Patent: Jul. 6, 2010

(54) SYSTEM AND PROCESS FOR GAS SWEETENING

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

(*) Notice: Subject to any disclaimer, the term of this patent is extended or adjusted under 35 U.S.C. 154(b) by 6 days.

(21) Appl. No.: 12/138,260

(22) Filed: Jun. 12, 2008

(65) Prior Publication Data

US 2009/0001320 A1 Jan. 1, 2009

Related U.S. Application Data

(60) Provisional application No. 60/946,459, filed on Jun. 27, 2007.

(51) Int. Cl.
  *C01B 17/05* (2006.01)
  *B01D 53/52* (2006.01)

(52) U.S. Cl. .............. 423/576.4; 423/576.6; 423/576.2; 423/224

(58) Field of Classification Search .................. 423/224, 423/576.2, 576.4, 576.6
See application file for complete search history.

(56) References Cited

U.S. PATENT DOCUMENTS

| | | | |
|---|---|---|---|
| 4,508,537 A | 4/1985 | Fenton et al. | |
| 4,649,032 A | 3/1987 | Snavely, Jr. et al. | |
| 5,102,635 A * | 4/1992 | Delaney et al. | ............. 423/220 |
| 5,126,118 A | 6/1992 | Hardison | |
| 5,160,714 A * | 11/1992 | Hardison | ................... 423/220 |
| 5,500,135 A | 3/1996 | Smith et al. | |
| 5,989,513 A | 11/1999 | Rai | |
| 6,368,366 B1 | 4/2002 | Langer et al. | |
| 2007/0020170 A1 * | 1/2007 | Khattaty et al. | .......... 423/573.1 |

* cited by examiner

*Primary Examiner*—Timothy C Vanoy
*Assistant Examiner*—Daniel Berns
(74) *Attorney, Agent, or Firm*—Conley Rose, P.C.

(57) ABSTRACT

A method for removing hydrogen sulfide from a sour gas stream comprising hydrogen sulfide by oxidizing hydrogen sulfide in a converter by contacting the sour gas stream with an aqueous catalytic solution, thereby producing a desulfurized gas stream and a liquid stream comprising reduced catalyst and elemental sulfur, introducing an oxidant and the liquid stream comprising reduced catalyst and elemental sulfur into a high shear device and producing a dispersion wherein the mean bubble diameter of the oxidant gas in the dispersion is less than about 5 μm, introducing the dispersion into a vessel from which a sulfur-containing slurry is removed and a regenerated catalyst stream is removed, wherein the sulfur slurry comprises elemental sulfur and aqueous liquid, and recycling at least a portion of the regenerated catalyst stream to the converter. A system of apparatus for carrying out the method is also provided.

17 Claims, 3 Drawing Sheets

SYSTEM AND PROCESS FOR GAS SWEETENING

CROSS-REFERENCE TO RELATED APPLICATIONS

This application claims the benefit under 35 U.S.C. §119 (e) of U.S. Provisional Patent Application No. 60/946,459 entitled "High Shear Gas Sweetening Process," filed Jun. 27, 2007 the disclosure of which is hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present invention generally relates to the desulfurization of gas streams containing hydrogen sulfide. More particularly, the present invention relates to a high shear system and method for catalytically oxidizing hydrogen sulfide in liquid streams comprising hydrogen sulfide to elemental sulfur and regenerating reduced catalyst for recycle by oxidation.

2. Background of the Invention

Many processes produce fluid streams comprising hydrogen sulfide. Often, hydrogen sulfide must be removed from a gas prior to venting the gas for disposal or further treatment. For example, hydrogen sulfide is a nuisance odor from wastewater treatment plants and facilities comprising reverse osmosis systems. Hydrogen sulfide can also be a naturally-present component in energy sources, including natural gas, oil, biogas, synthesis gas, geothermal gas streams, and others. Hydrodesulfurization of liquid streams by hydrogen treatment in the presence of a hydrodesulfurization catalyst is frequently used to convert organic sulfur compounds to hydrogen sulfide. The hydrogen sulfide must then be removed from the liquid streams. Combustion of hydrogen sulfide produces sulfur dioxide, which is believed to lead to the production of acid rain and potential destruction of the environment. Furthermore, when contacted with water, hydrogen sulfide forms sulfuric acid which is corrosive to the metals of process apparatus.

One commercial desulfurization process is the LO-CAT process of Gas Technology Products, LLC of Schaumberg, Ill. The Lo-CAT process is a method for performing a modified Claus reaction. The Lo Cat process is a wet scrubbing, liquid redox system that uses a chelated iron solution (homogeneous catalytic, i.e. 'LoCat', solution) to convert $H_2S$ to elemental sulfur.

A considerable amount of effort has been devoted to developing mass transfer devices which improve the oxygen utilization in conventional liquid oxidation systems (such as the Lo-CAT system) with the aim of reducing the quantity of air required (operating cost) and reducing the size of the oxidizing vessels (capital cost). Currently, there are two types of oxidizers employed: low head and high head oxidizers. In low head oxidizers, air is sparged through approximately 3 meters of solution at superficial air velocities of less than 3.5 m/min by means of distributors equipped with EPDM (ethylene propylene diene monomer) sleeves which are perforated with very small holes. Solution flow is perpendicular to the airflow. Such low head oxidizers are relatively poor mass transfer devices. Low head oxidizers do, however, provide much needed solution inventory for proper operation of the system.

In high head oxidizers, air is sparged through approximately 7 meters of solution at superficial velocities of greater than 10 m/min by means of coarse bubble pipe distributors. Solution flow is co-current to the airflow in high head oxidizers. These oxidizers provide mass transfer coefficients which are approximately 4 times better than those of low head oxidizers; however, this is at the expense of higher discharge heads on the air blowers.

Accordingly, there is a need in industry for improved processes for desulfurizing (i.e. sweetening) gas streams.

SUMMARY

High shear systems and methods for improving removing hydrogen sulfide from gas streams are disclosed. In accordance with certain embodiments, a method for gas sweetening is provided for removing hydrogen sulfide from a sour gas stream comprising hydrogen sulfide, the method comprising: oxidizing hydrogen sulfide in a converter by contacting the sour gas stream with an aqueous catalytic solution, thereby producing a desulfurized gas stream and a liquid stream comprising reduced catalyst and elemental sulfur; introducing an oxidant and the liquid stream comprising reduced catalyst and elemental sulfur into a high shear device and producing a dispersion wherein the mean bubble diameter of the oxidant gas in the dispersion is less than about 5 μm; introducing the dispersion into a vessel from which a sulfur-containing slurry is removed and a regenerated catalyst stream is removed, wherein the sulfur slurry comprises elemental sulfur and aqueous liquid; and recycling at least a portion of the regenerated catalyst stream to the converter. The method may further comprise removing at least a portion of the aqueous solution from the sulfur-containing slurry and recycling at least a fraction of the recovered aqueous solution to the vessel. In embodiments, the vessel is an oxidizer comprising spargers whereby additional oxidant gas is introduced into the vessel.

Also disclosed herein is a method for sweetening a sour gas stream, the method comprising: forming a dispersion comprising oxidant gas bubbles dispersed in a liquid phase comprising reduced redox liquid catalyst, wherein the bubbles have a mean diameter of less than 1 micron. The gas bubbles may have a mean diameter of less than 400 nm. In embodiments, the gas bubbles have a mean diameter of no more than 100 nm. The sour gas may comprise a gas selected from the group consisting of air, natural gas, carbon dioxide, amine acid gas, landfill gas, biogas, synthesis gas, geothermal gas, refinery gas, and combinations thereof. In embodiments, forming the dispersion comprises subjecting a mixture of the oxidant gas and the liquid catalytic phase to a shear rate of greater than about 20,000 s$^{-1}$. Forming the dispersion may comprise contacting the oxidant gas and the liquid catalytic phase in a high shear device, wherein the high shear device comprises at least one rotor, and wherein the at least one rotor is rotated at a tip speed of at least 22.9 m/s (4,500 ft/min) during formation of the dispersion. The high shear device may produce a local pressure of at least about 1034.2 MPa (150,000 psi) at the tip of the at least one rotor. The energy expenditure of the high shear device may be greater than 1000 W/m$^3$. In embodiments, the redox catalyst is selected from organometallics and iron chelate catalysts.

Also disclosed is a method for removing hydrogen sulfide from sour gas, the method comprising: oxidizing hydrogen sulfide gas by contacting the sour gas with a liquid comprising an oxidized catalyst in a converter to produce a converter liquid product stream comprising sulfur and reduced catalyst; forming a fluid mixture comprising the converter liquid product stream and oxidant gas; exposing the fluid mixture to a shear rate of at least about 20,000 s$^{-1}$ to produce a dispersion of oxidant in a continuous phase of the liquid; and introducing the dispersion into a vessel from which a sulfur slurry is removed and from which a liquid stream comprising regenerated oxidized liquid catalyst is recycled to the converter. The method may further comprise: introducing the sulfur slurry to a separator from which aqueous liquid in the slurry is removed from the sulfur; and recycling the aqueous liquid removed from the slurry to the vessel. The average bubble diameter of the oxidant gas in the dispersion may be less than 1 μm. The dispersion may be stable for at least about 15 minutes at atmospheric pressure. In embodiments, exposing the fluid mixture to a shear rate of greater than about 20,000 s$^{-1}$ comprises introducing the fluid into a high shear device comprising at least two generators.

Also disclosed is a system for removing hydrogen sulfide from a sour gas stream, the system comprising: a converter comprising an inlet for sour gas, an inlet for a liquid stream comprising oxidized catalyst, and an outlet line for a converter liquid product comprising sulfur and reduced liquid catalyst; a dispersible gas inlet whereby oxidant may be introduced into the outlet line; an external high shear device downstream of the dispersible gas inlet, the external high shear device comprising an inlet in fluid communication with the converter outlet line, and a high shear device outlet; an oxidizer in fluid communication with the high shear device outlet; and a recycle line fluidly connecting the oxidizer and the inlet line for a liquid stream of the converter, whereby regenerated oxidized catalyst may be recycled to the converter. The external high shear device may comprise a toothed rim disperser comprising at least one generator set comprising a rotor and a stator having a shear gap width defined as the minimum clearance between the rotor and the stator, wherein the rotor is rotatable at a tip speed whereby the shear rate defined as the tip speed divided by the shear gap width is at least 100,000 s$^{-1}$ is produced. The external high shear device may have a tip speed of greater than 20.3 m/s (4000 ft/min). In embodiments, the external high shear device is capable of producing a dispersion of oxidant bubbles in aqueous catalytic solution, the oxidant bubbles having an average bubble diameter on the submicrometer scale. The system may comprise at least two high shear devices.

Also disclosed is an improvement in a system for removing hydrogen sulfide from a sour gas stream, the system comprising an absorption unit, a redox catalyst that becomes reduced upon converting hydrogen sulfide to elemental sulfur, an oxidization unit for regenerating the reduced catalyst, and a catalyst recycling system for returning regenerated catalyst to the absorption unit, the improvement comprising: inserting a high shear device in line between the converter and the oxidization unit, the high shear device comprising at least two generators, wherein at least one of the generators produces a shear rate of at least 10,000 s$^{-1}$. The shear rate provided by one generator may be greater than the shear rate provided by another generator.

Some embodiments of the system potentially make possible the sweetening of gas streams without the need for large volume reactors, via use of an external pressurized high shear reactor.

Certain embodiments of an above-described method or system potentially provide for more optimal time, temperature and pressure conditions than are otherwise possible, and which potentially increase the rate of the multiphase process. Certain embodiments of the above-described methods or systems potentially provide overall cost reduction by operating at lower temperature and/or pressure, providing increased product per unit of catalyst consumed, decreased reaction time, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
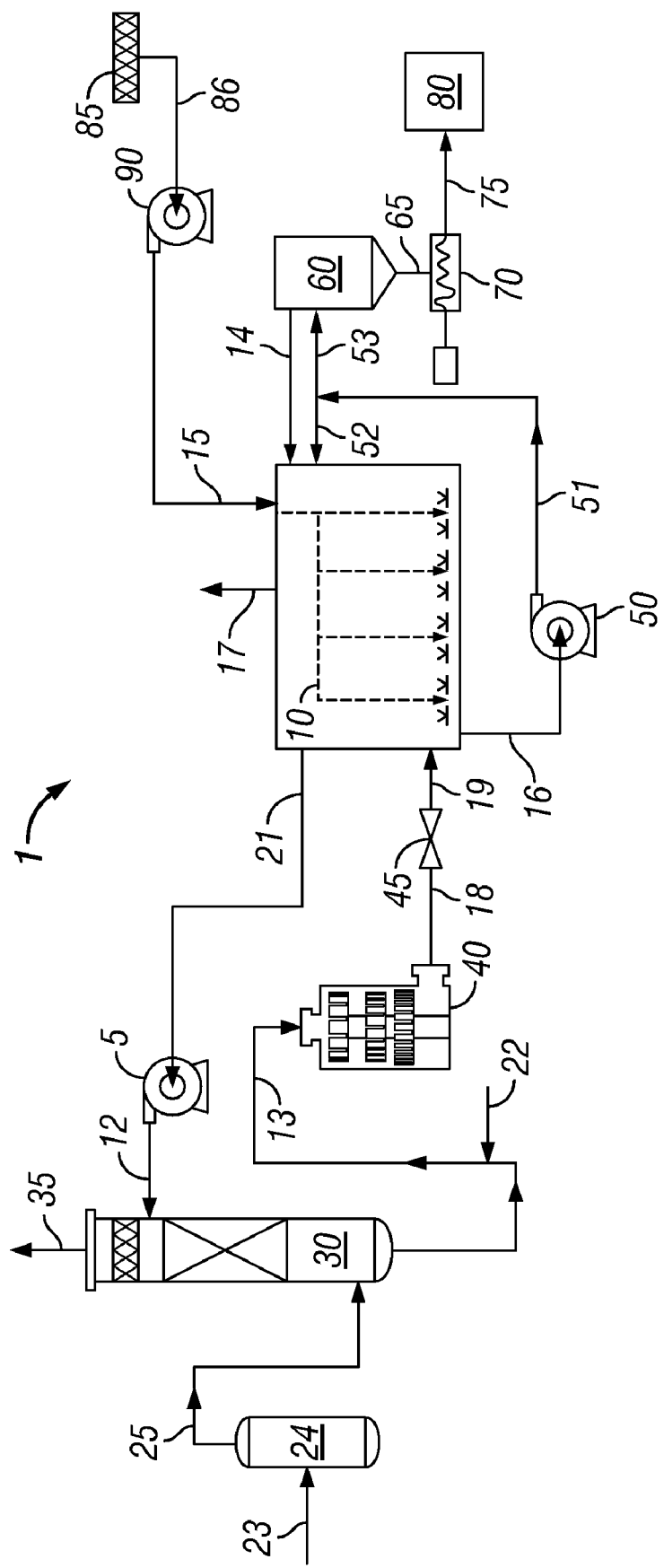
FIG. 1 is a schematic of a high shear gas sweetening system comprising external high shear dispersing according to an embodiment of the present disclosure.

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

DETAILED DESCRIPTION

Overview

The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction.

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes.

Furthermore, without wishing to be limited by theory, it is believed that the high shear conditions provided by a reactor assembly that comprises an external high shear device or mixer as described herein may permit gas sweetening at global operating conditions under which reaction may not conventionally be expected to occur to any significant extent.

System for Gas Sweetening. A high shear gas sweetening system will now be described in relation to FIG. 1, which is a process flow diagram of an embodiment of a high shear system 1 for removing hydrogen sulfide from a gas stream comprising hydrogen sulfide. High shear sulfur removal system 1 can be thought of as having four process zones; converter (absorber), high shear device/oxidizer, oxidizer/sulfur separation, and sulfur handling. The basic components of a representative high shear system for liquid reduction oxidation desulfurization include converter 30, external high shear device (HSD) 40, vessel 10, and pump 5. As shown in FIG. 1, high shear device 40 is located external to vessel/reactor 10. Each of these components is further described in more detail below. Line 25 introduces gas containing hydrogen sulfide into converter 30. In some applications, high shear gas sweetening system 1 further comprises sour gas feed stream pretreatment, such as, for example, knock out pot 24. Knock-out pot 24 may be fed via inlet line 23 through which sour gas is fed into high shear gas sweetening system 1. Line 25 may connect knock-out pot 24 with converter 30.

Line 21 may be connected to pump 5 for introducing liquid catalyst into converter 30. Pump 5 may be, in some embodiments, positioned elsewhere throughout high shear gas sweetening system 1, for example, between converter 30 and HSD 40. Treated gas exits converter 30 via line 35. Line 13 connects converter 30 to HSD 40, and line 18 fluidly connects HSD 40 with vessel 10. Line 22 may be connected to line 13 for introducing oxidant (e.g., air or enriched air) into HSD 40. Alternatively, line 22 may be connected directly to an inlet of HSD 40. High shear gas sweetening system 1 may further comprise venture sparger 45, which may be connected to HSD 40 via line 18 and to vessel 10 via line 19. Line 17 may be connected to vessel 10 for removal of vent gas. Additional components or process steps may be incorporated throughout high shear gas sweetening system 1, for example, between vessel 10 and HSD 40, or ahead of pump 5 or HSD 40, if desired, for example, heat exchangers. Line 21 connects vessel 10 with converter 30 to provide for catalyst recycle, if desired.

In some applications, high shear gas sweetening system 1 further comprises sulfur separation apparatus, for example, sulfur settler 60, slurry pump 70, settler feed pump 50, or a combination thereof. Settler feed pump 50 may be fluidly connected via line 16 to oxidizer vessel 10 whereby a sulfur slurry is extracted from vessel 10. Line 51 may connect an outlet of settler feed pump 50 with sulfur settler 60 via line 53 and to oxidizer vessel 10 via line 52.

Sulfur settler 60 may be connected to slurry pump 70 via line 65. Line 75 may be connected to slurry pump 70 and may be used to send sulfur for further separation 80. Aqueous catalytic solution separated in settler 60 may be returned to vessel 10 via line 14.

High shear gas sweetening system 1 may further comprise air blower 90. Air blower 90 may be connected to vessel 10 to provide optional secondary air to vessel 10. Air blower 90 may be connected to filter and silencer 85.

Converter. Converter 30 comprises a contactor in which sour gas is contacted with a homogeneous liquid catalyst solution. Converter 30 may be referred to as an absorber. In embodiments, any liquid reduction oxidation catalyst suitable for oxidizing hydrogen sulfide to produce elemental sulfur is employed. These include, for example, catalysts comprising chelate of iron or other organometallics. In embodiments, the desulfurization reaction is carried out in the aqueous phase using chelated iron as the catalytic reagent. Chelating agents are organic compounds which wrap around iron ions in a claw-like fashion to form chemical bonds between two or more non-iron atoms and the iron atom. The system is typically operated in the mildly alkaline pH range to insure good absorption of $H_2S$ into the slightly alkaline liquid catalyst solution. A suitable catalyst is the LoCat solution of Gas Technology Products LLC. Liquid homogeneous catalytic solution 21 may be introduced into converter 30 via pump 5 and converter inlet line 12. In embodiments, liquid catalytic solution flows countercurrently to sour gas flow through converter 30. In embodiments, converter 30 is a sparged absorber. In such an embodiment, acid gas from line 25 is sparged into converter 30. Hydrogen sulfide in the sour gas is oxidized by reaction with the catalyst to form elemental sulfur, and the catalyst is reduced. The catalyst circulates through converter 30 by the lift generated by, for example, sparging. Treated gas from which hydrogen sulfide has been removed exits converter 30 via line 35. Converter liquid product comprising elemental sulfur and reduced catalyst exits converter 30 via line 13.

High Shear Device. External high shear device (HSD) 40, also sometimes referred to as a high shear device or a high shear mixing device, is configured for receiving an inlet stream via line 13, comprising converter liquid product and oxidant. Oxidant is introduced into high shear device 40 via dispersible gas line 22, which may inject oxidant into line 13 upstream of HSD 40. Alternatively, HSD 40 may be configured for receiving the liquid and oxidant reactant streams via separate inlet lines (not shown). Although only one high shear device is shown in FIG. 1, it should be understood that some embodiments of the system may have two ore more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles in a reactant mixture flowing through the device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and high shear rotor-stator dispersers, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 W/m³. In embodiments, the energy expenditure of HSD 40 is in the range of from about 3000 W/m³ to about 7500 W/m³.

The shear rate is the tip speed divided by the shear gap width (minimal clearance between the rotor and stator). The shear rate generated in HSD 40 may be in the greater than 20,000 s⁻¹. In some embodiments the shear rate is at least 40,000 s⁻¹. In some embodiments the shear rate is at least 100,000 s⁻¹. In some embodiments the shear rate is at least 500,000 s⁻¹ In some embodiments the shear rate is at least 1,000,000 s⁻¹. In some embodiments the shear rate is at least 1,600,000 s⁻¹. In embodiments, the shear rate generated by HSD 40 is in the range of from 20,000 s⁻¹ to 100,000 S⁻¹. For example, in one application the rotor tip speed is about 40 m/s (7900 ft/min) and the shear gap width is 0.0254 mm (0.001 inch), producing a shear rate of 1,600,000 so. In another application the rotor tip speed is about 22.9 m/s (4500 ft/min) and the shear gap width is 0.0254 mm (0.001 inch), producing a shear rate of about 901,600 s⁻¹.

HSD 40 is capable of highly dispersing or transporting oxidant gas into a main liquid phase (continuous phase) comprising reduced liquid catalyst, with which it would normally be immiscible, at conditions such that at least a portion of the liquid catalyst is oxidized. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the DISPAX REACTOR® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 DISPAX REACTOR® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size (e.g., oxidant gas bubbles). In some embodiments, each of the stages is operated with super-fine generator. In some embodiments, at least one of the generator sets has a minimum rotor/stator clearance (shear gap width) of greater than about 5.08 mm (0.20 inch). In alternative embodiments, at least one of the generator sets has a minimum rotor/stator clearance of greater than about 1.78 mm (0.07 inch).

Figure 2:
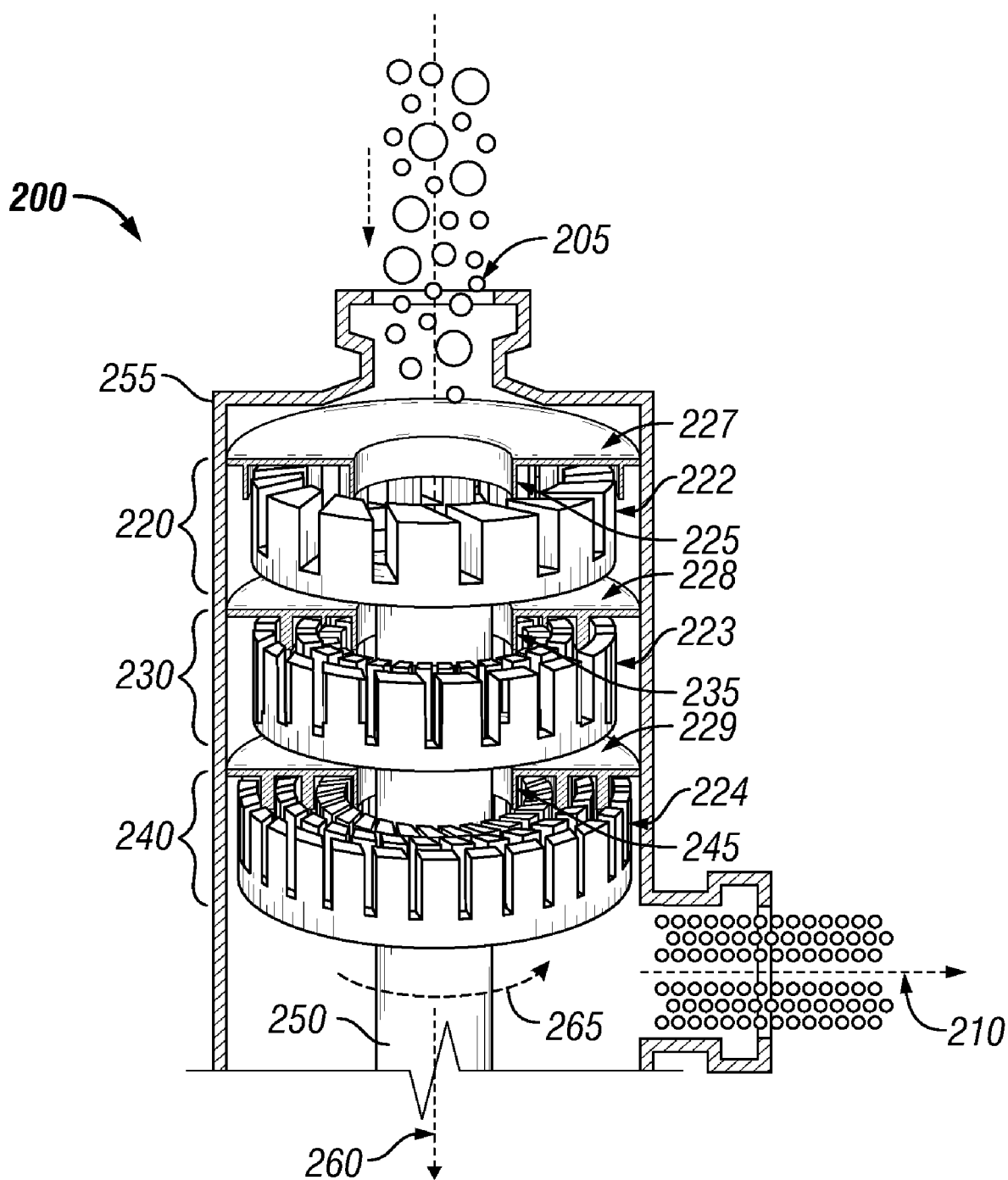
FIG. 2 is a longitudinal cross-section view of a multi-stage high shear device, as employed in an embodiment of the system.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223 and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10.0 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In some embodiments, rotors 222, 223, and 224 comprise more than ten rotor teeth circumferentially spaced about the circumference of each rotor. in embodiments, stators 227, 228, and 229 comprise more than 10 stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm.

High shear device 200 is configured for receiving from line 13 a reactant stream at inlet 205. The reaction mixture comprises oxidant gas as the dispersible phase and liquid comprising reduced catalyst as the continuous phase. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, producing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion has an average gas bubble size less than about 5 µm. In embodiments, HSD 40 produces a dispersion having a mean bubble size of less than about 1.5 µm. In embodiments, HSD 40 produces a dispersion having a mean bubble size of less than 1 µm; preferably the bubbles are sub-micron in diameter. In certain instances, the average bubble size is from about 0.1 µm to about 1.0 µm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising dispersed gas bubbles capable of remaining dispersed at atmospheric pressure for at least about 15 minutes.

The bubbles of oxidant gas in the product dispersion created by high shear device 200 facilitate and/or accelerate the oxidation of the catalyst by enhancing contact of the reactants. The rotor may be set to rotate at a speed commensurate with the diameter of the rotor and the desired tip speed as described hereinabove.

In certain instances, high shear device 200 comprises a DISPAX REACTOR® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Vessel. Vessel or oxidizer 10 is any type of vessel from which a slurry of sulfur product can be separated and within which oxidation of homogeneous catalyst may propagate. For instance, a continuous or semi-continuous stirred tank reactor, or one or more batch reactors may be employed in series or in parallel. In some applications vessel 10 is an oxidizer. Oxidant may be introduced into vessel 10 from an optional secondary air source via blower 90 and line 15. Oxidant may be introduced through spargers which may line the cross-section of vessel 10 above the bottom section of the vessel in which sulfur slurry settles. Sulfur slurry may be removed from a cone-shaped bottom of the vessel 10. Any number of inlet lines to vessel 10 is envisioned, with three shown in FIG. 1 (lines 14, 15 and 52). Inlet line 14 may be an inlet line connected to sulfur settler 60 and designed for the return to vessel 10 of liquid catalytic solution separated from product sulfur slurry. Inlet line 15 may be utilized to provide optional secondary air via blower 90. Line 52 may connect the outlet of pump 50 in line 51 to vessel 10. Vessel 10 may comprise an exit line 17 for vent gas, and an outlet product line 16 for a product stream comprising a slurry of sulfur in liquid solution. In embodiments, vessel 10 comprises a plurality of reactor product lines 16. Line 21 may connect vessel/oxidizer 10 with converter 30 via pump 5 and line 12.

Oxidation of homogeneous catalyst will occur whenever suitable time, temperature and pressure conditions exist. In this sense catalyst oxidation may occur at any point in the flow diagram of FIG. 1 if temperature and pressure conditions are suitable. Due to the use of a liquid catalyst, substantial oxidation of the reduced catalyst may occur at points outside oxidizer/vessel 10 shown in FIG. 1. Nonetheless a discrete reactor/vessel 10 is often desirable to allow for increased residence time, agitation and heating and/or cooling. In embodiments, it is envisioned that substantial oxidation/regeneration of the catalyst will occur within HSD 40 (or a series or parallel combination of high shear devices 40). In such instances, vessel 10 may serve primarily as a separator from which a slurry of sulfur may be removed for sulfur processing via line 16 and from which regenerated (oxidized) liquid catalyst is returned to converter 30 for reuse, via line 21. In such embodiments, optional secondary air source line 15, air blower 90, and filter/silencer 85 may be absent from the system, or may serve to provide air only to one or more HSD 40 via line 22.

Vessel 10 may include one or more of the following components: heating and/or cooling capabilities, pressure measurement instrumentation, temperature measurement instrumentation, one or more injection points, and level regulator (not shown), as are known in the art of reaction vessel design. A heating and/or cooling apparatus may comprise, for example, a heat exchanger. Alternatively, as much of the conversion reaction may occur within HSD 40 in some embodiments, vessel 10 may serve primarily as a storage or separation vessel in some cases. Although generally less desired, in some applications vessel 10 may be omitted, particularly if multiple high shear devices/reactors are employed in series, as further described below.

In alternative embodiments, converter liquid product stream is introduced into a separator upstream of HSD 40. In this arrangement, sulfur may be removed from converter product in line 13, yielding a liquid catalytic stream comprising reduced liquid catalyst. The reduced liquid catalyst may be introduced into HSD 40 along with oxidant in order to regenerate the liquid catalyst for reuse in converter 30. In such an embodiment, vessel 10 may not be present in high shear gas sweetening system 1, as the majority of the regeneration of catalyst may occur within HSD 40, or a series of high shear devices 40, and sulfur separation was performed upstream of the high shear device(s).

Heat Transfer Devices. In addition to the above-mentioned heating/cooling capabilities of vessel 10, other external or internal heat transfer devices for heating or cooling a process stream are also contemplated in variations of the embodiments illustrated in FIG. 1. For example, if desired, heat may be added to or extracted from vessel 10 via any method known to one skilled in the art. The use of external heating and/or cooling heat transfer devices is also contemplated. Some suitable locations for one or more such heat transfer devices are between pump 5 and converter 30, between HSD 40 and vessel 10, and between vessel 10 and pump 5. Some non-limiting examples of such heat transfer devices are shell, tube, plate, and coil heat exchangers, as are known in the art.

Pumps. Pump 5 is configured for either continuous or semi-continuous operation, and may be any suitable pumping device that is capable of providing greater than 202.65 kPa (2 atm) pressure, preferably greater than (303.975 kPa (3 atm) pressure, to allow controlled flow through HSD 40 and system 1. For example, a Roper Type 1 gear pump, Roper Pump Company (Commerce Georgia) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pump (not shown) may be included in the system illustrated in FIG. 1. For example, a booster pump, which may be similar to pump 5, may be included between HSD 40 and vessel 10 for boosting the pressure into vessel 10. As another example, a supplemental feed pump, which may be similar to pump 5, may be included for introducing additional reactants or catalyst into vessel 10. As still another example, a compressor type pump may be positioned between line 17 and HSD 40 for recycling gas from vessel 10 to HSD 40. Settler pump 50 may be any pump suitable for extracting a sulfur slurry from vessel 10.

Figure 3:
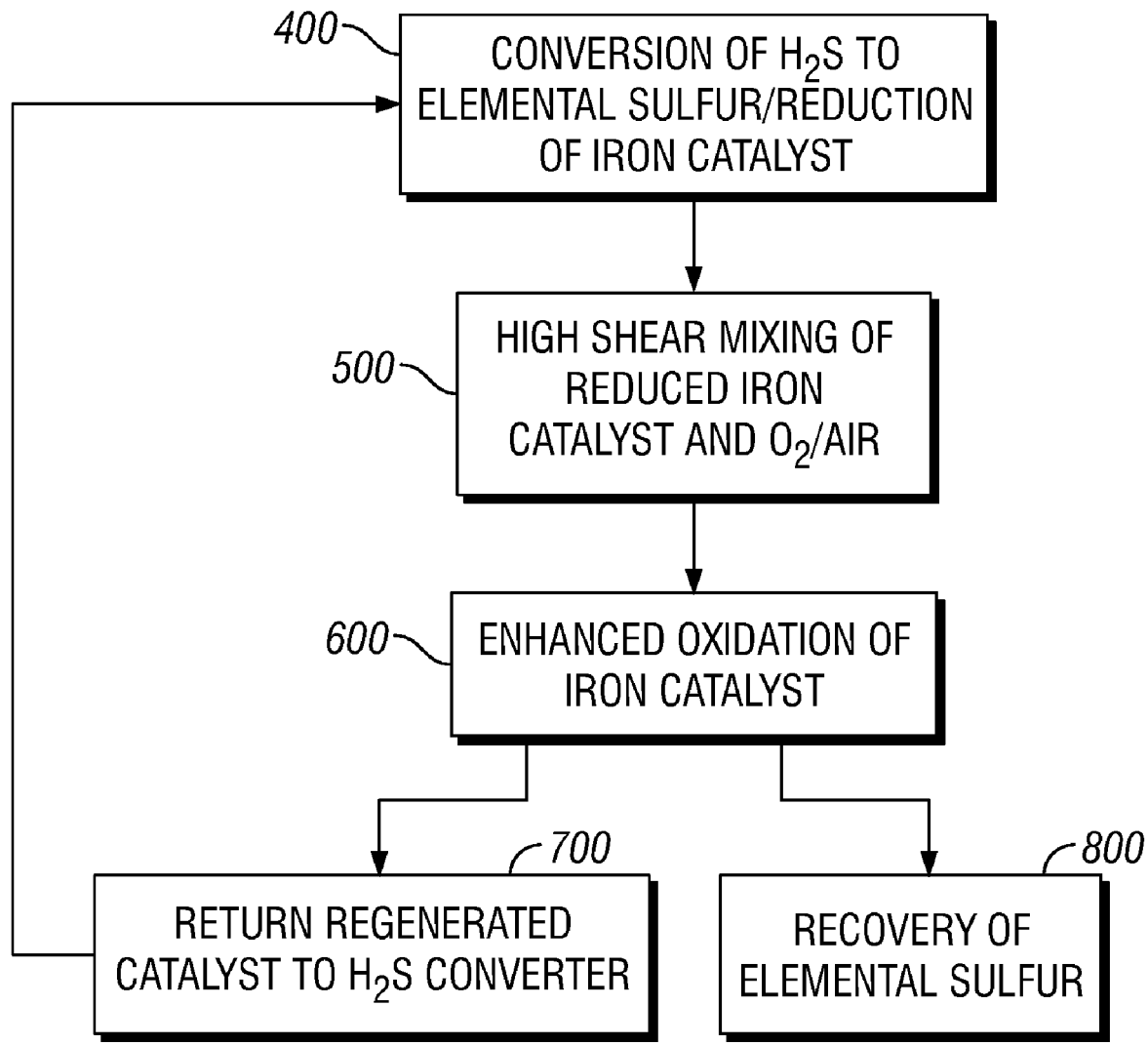
FIG. 3 is a box flow diagram of a high shear desulfurization process according to an embodiment of the present disclosure.

High Shear Desulfurization Process. FIG. 3 is a box flow diagram showing the steps in the high shear gas sweetening method. At block 400, $H_2S$ is converted to elemental sulfur with concomitant reduction of liquid phase catalyst. At block 500, high shear mixing of iron catalyst with oxidant (e.g., $O_2$, air, enriched air) produces a dispersion of oxidant in liquid comprising liquid reduction oxidation catalyst. At block 600, enhanced oxidation of iron catalyst occurs in vessel 10, within HSD 40, or in line 18, optional venture sparger 45, and/or line 19. At block 700 return of regenerated (oxidized) catalytic solution to $H_2S$ converter 30 proceeds via line 21, pump 5, and line 12. At block 800, recovery of elemental sulfur and recycle of recovered catalytic solution to oxidizer 10 from sulfur recovery units (e.g., from sulfur settler 60) are indicated.

Operation of high shear gas sweetening system 1 will now be discussed with reference to FIG. 1. In embodiments, the desulfurization reaction is carried out in the aqueous phase using chelated iron as the catalytic reagent. In operation for the desulfurization of sour gas streams, a sour gas stream is introduced into system 1 via line 25. Knock-out pot 24 may be utilized to remove particulate matter from a sour gas feedstream introduced into knock-out pot 24 via line 23. Within converter 30, sour gas is contacted with oxidized liquid catalytic solution, which may be introduced countercurrently into converter 30, for example, via line 12.

The system is typically operated in the mildly alkaline pH range to insure good absorption of the H$_2$S into the catalyst solution, and alkaline injection and monitoring may occur anywhere suitable within high shear gas sweetening system 1. For example, alkali may be added to converter 30. During start-up, liquid catalyst may be introduced directly into vessel 10 as a catalyst stream. Alternatively, or additionally, catalyst may be added elsewhere in system 1. For example, fresh catalyst solution may be injected into line 21 (not shown) or into converter 30. In embodiments, line 21 comprises liquid catalyst, at least a portion of which may be a recycle stream from, for example, vessel 10 which may be connected via line 21 to converter 30.

The overall process reaction is:

$$H_2S(g) + \tfrac{1}{2}O_2(g) \leftrightarrow H_2O + S° \qquad (1)$$

Sour gas stream in line 25 may be any hydrogen sulfide or sulfur containing gas stream, for example, sour gas stream in line 25 may comprise air, natural gas, carbon dioxide, amine acid gas, landfill gas, synthesis gas, geothermal gas, biogas, refinery gas, or any combination thereof. Sour gas stream in line 23 may be pretreated as is known to those of skill in the art. For example, in FIG. 1, sour gas stream in line 23 is passed through knock out pot 24. Hydrogen sulfide-containing gas stream in line 25 from knock out pot 24 is sent to converter 30. In converter 30, H$_2$S is converted to elemental sulfur. Treated (i.e. sweetened) gas stream in line 35 is sent for further processing/utilization (not shown). In embodiments, high shear gas sweetening system 1 is effective for greater than 99% removal of hydrogen sulfide from the sour gas. In embodiments, high shear gas sweetening system 1 is effective for greater than 99.9% removal of hydrogen sulfide from the sour gas.

Within converter 30, liquid catalyst converts H$_2$S to elemental sulfur via several chemical reactions. The converter design is determined by the sour gas flow and pressure, as well the H$_2$S removal efficiency required. For an iron catalyst, the absorption in converter 30 may be described by the following reactions.

The absorption of H$_2$S may be described as:

$$H_2S(g) + H_2O(l) \leftrightarrow H_2S(l) + H_2O. \qquad (2)$$

The ionization of H$_2$S is described by the reaction:

$$H_2S(l) \leftrightarrow H^+ + HS^-. \qquad (3)$$

The oxidation by ferric ions (Fe$^{3+}$) may be depicted as:

$$HS^- + 2Fe^{3+} \rightarrow S°(s) + 2Fe^{2+} + H^+. \qquad (4)$$

Therefore, the overall absorption reaction is:

$$H_2S(g) + 2Fe^{3+} \rightarrow 2H^+ + S° + 2Fe^{2+}. \qquad (5)$$

A liquid stream comprising sulfur and reduced liquid catalytic solution exits converter 30 via converter outlet line 13. Dispersible oxidant gas is injected into high shear gas sweetening system 1 via line 22, which may introduce oxidant gas into line 13 or directly into HSD 40. The oxidant gas may be air or enriched air. In embodiments, the oxidant gas is fed directly into HSD 40, rather than being combined with the liquid reactant stream (i.e., sulfur-containing liquid catalytic stream exiting converter 30 via line 13). Pump 5 may be operated to pump the regenerated liquid catalyst from line 21 and vessel 10 through line 12 into converter 30, and to build pressure, providing a controlled flow throughout high shear device (HSD) 40 and high shear gas sweetening system 1. In some embodiments, pump 5 increases the pressure of the HSD inlet stream to greater than 202.65 kPa (2 atm), preferably greater than about 303.975 kPa (3 atmospheres). In this way, high shear gas sweetening system 1 may combine high shear with pressure to enhance reactant intimate mixing.

In embodiments, liquid catalytic solution and, if present, alkali are first mixed in vessel 10. Reactants enter vessel 10 via, for example, inlet lines 14, 15, and 52. Any number of vessel inlet streams is envisioned, with three shown in FIG. 1 (via lines 14, 15, and 52).

Oxidant and catalytic liquid are intimately mixed within HSD 40, which serves to create a fine dispersion of the oxidant gas in the catalytic liquid. In HSD the oxidant gas and catalytic liquid are highly dispersed such that nanobubbles, submicron-sized bubbles, and/or microbubbles of the gas are formed for superior dissolution into solution and enhancement of reactant mixing. For example, disperser IKA® model DR 2000/4, a high shear, three stage dispersing device configured with three rotors in combination with stators, aligned in series, may be used to create the dispersion of dispersible oxidant gas in liquid catalytic medium comprising sulfur (i.e., "the reactants"). The rotor/stator sets may be configured as illustrated in FIG. 2, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/stator combination, which may comprise a rotor and a stator having rotor teeth and stator teeth, respectively. The dispersion exits the high shear device via line 19. In some embodiments, the shear rate increases stepwise longitudinally along the direction of the flow, 260. For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If the high shear device 40 includes a PTFE seal, the seal may be cooled using any suitable technique that is known in the art. For example, the reactant stream flowing in line 13 or regenerated liquid catalyst in line 21 may be used to cool the seal and in so doing be preheated as desired prior to entering high shear device 40 or converter 30 respectively.

In applications, the rotor(s) of HSD 40 is (are) set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the oxidant gas and the liquid catalytic solution comprising sulfur product. In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm² under cavitation conditions. The high shear mixing results in dispersion of the oxidant gas in micron or submicron-sized bubbles. In some embodiments, the resultant dispersion has an average bubble size less than about 5 μm, alternatively, less than about 1.5 μm. In some embodiments, the resultant dispersion has an average bubble size of less than 1 μm. Accordingly, the dispersion exiting HSD 40 via line 18 comprises micron and/or submicron-sized gas bubbles. In some embodiments, the mean bubble size is in the range of about 0.4 μm to about 1.5 μm. In some embodiments, the mean bubble size is less than about 400 nm, and may be about 100 nm in some cases. In many embodiments, the microbubble dispersion is able to remain dispersed at atmospheric pressure for at least 15 minutes.

Once dispersed, the resulting dispersion exits HSD 40 via line 18 which is fluidly connected to vessel 10. Optionally, the dispersion may be further processed prior to entering vessel 10, if desired. For example, high shear gas sweetening system 1 may further comprise venture sparger 45 positioned between HSD 40 and vessel 10. An outlet line 19 may connect venture sparger 45 with vessel 10. In cases where venture sparger 45 will limit throughput, a sparger may not be utilized. Oxidizer inlet line 19 fluidly connects to oxidizer 10 wherein further catalytic solution oxidation (regeneration) may occur. In instances where HSD 40 is being incorporated into an existing gas sweetening system comprising a venture sparger, the venture sparger 45 may be retained or eliminated depending on throughput limitations of the venture sparger.

Reduced liquid catalyst exiting converter 30 is regenerated by oxidation. Oxidation of the catalyst will occur within HSD 40 and may continue during residence within vessel 10. As mentioned hereinabove, vessel 10 may be an oxidizer. For iron chelate catalyst, the oxidation reaction (which may occur within HSD 40, line 18, venture sparger 45, line 19, vessel 10, or a combination thereof) can be described in the following chemical reactions:

The absorption of $O_2$ is depicted as:

$$\tfrac{1}{2}O_2(g) + H_2O(l) \leftrightarrow \tfrac{1}{2}O_2(l) + H_2O. \tag{6}$$

The regeneration of ferrous ions ($Fe^{2+}$) follows the reaction:

$$\tfrac{1}{2}O_2(l) + H_2O + 2Fe^{2+} \rightarrow 2OH^- + 2Fe^{3+}. \tag{7}$$

Therefore, the overall regeneration reaction is:

$$\tfrac{1}{2}O_2(g) + H_2O + 2Fe^{2+} \rightarrow 2OH^- + 2Fe^{3+}. \tag{8}$$

As a result of the intimate mixing of the reactants prior to entering vessel 10, a significant portion of the chemical reaction may take place in HSD 40. Accordingly, in some embodiments, reactor/vessel 10 may be used primarily for separation of product sulfur from the liquid catalytic solution. Alternatively, or additionally, vessel 10 may serve as a primary reaction vessel where most of the regeneration/oxidation of redox catalyst occurs. For example, in embodiments, vessel 10 is an oxidizer. In embodiments in which HSD 40 is being incorporated into an existing gas sweetening process comprising an oxidizer, vessel 10 may be the oxidizer. For new installations, vessel 10 may serve primarily as a storage/separation vessel from which sulfur product is removed.

Vessel/reactor 10 may be operated in either continuous or semi-continuous flow mode, or it may be operated in batch mode. The contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using level regulators (not shown), employing techniques that are known to those of skill in the art.

Vent gas exits vessel 10 via vent line 17 and may be further treated, vented, and/or recycled to high shear gas sweetening system 1. For example, a portion of vent gas in line 17 may be recycled to line 13 or line 22. Vessel 10 may have a conical-shaped bottom to aid in the settling and removal of sulfur slurry therefrom. Product sulfur slurry comprising sulfur crystals exits vessel 10 via line 16. Product sulfur slurry may be sent via settler pump 50 and lines 51 and 53 to sulfur settler 60. A portion of line 51 may be sent via line 52 back into vessel/oxidizer 10. Sulfur slurry in sulfur settler 60 settles into the bottom (e.g., cone-shaped section) of settler 60, and is pumped from the cone via sulfur line 65 and slurry pump 70 to sulfur separation unit 80. For example, sulfur separation unit 80 may employ a belt filter system to produce a 60% sulfur cake. As another example, in some instances, sulfur separation unit 80 may comprise a bag filter system and may be used to produce a 30 wt % sulfur cake. If desired, the sulfur filter cake may be used to produce molten sulfur. Regenerated catalytic solution 14 separated from sulfur cake may be sent back to oxidizer 10.

Oxygen used in conventional oxidation of the catalyst is supplied from air or oxygen-enriched air 15 which is bubbled through the catalyst solution in oxidizer 10. High shear gas sweetening system 1 may comprise a secondary source of oxidant via blower 90 and oxidant inlet line 15. Oxidizer line 15 may be obtained via prefiltering at prefilter 85 and pumping via blower 90 and line 86 from prefilter 85 to oxidizer/vessel 10. A small caustic addition to high shear gas sweetening system 1 (not shown) may be used to maintain the catalyst solution in the mildly alkaline pH range.

This liquid phase oxidation process uses oxygen carriers dissolved or suspended in a liquid phase, which can then be regenerated continuously at ambient temperatures in certain embodiments. In contrast to other systems mentioned hereinabove, this modified system comprises an enclosed external high shear device 40 to create microbubbles (and/or submicron-sized bubbles) of air / enriched air or oxygen in line 18 (and optionally venture-sparged line 19) that then enters oxidation unit 10. External high shear device 40 may be positioned ahead of the venture sparger 45 of existing systems, and allows for rapid oxidation and high conversions of catalyst.

Potential benefits of this modified system include, but are not limited to, faster cycle times, increased throughput, reduced operating costs and/or reduced capital expense due to the possibility of designing smaller vessel(s) and/or operating the vessel(s) at lower temperature and/or pressure.

In embodiments, the process of the present disclosure provides more effective elimination of sulfur compared to desulfurization in the absence of external high shear mixing.

In some embodiments, the operating conditions of system 1 comprise a temperature in the range of from about 100° C. to about 230° C. In embodiments, the temperature is in the range of from about 160° C. to 180° C. In specific embodiments, the reaction temperature in vessel 10, in particular, is in the range of from about 155° C. to about 160° C. In some embodiments, the reaction pressure in vessel 10 is in the range of from about 202.65 kPa (2 atm) to about 5.6 MPa-6.1 MPa (55-60 atm). In some embodiments, reaction pressure is in the range of from about 810.6 kPa to about 1.5 MPa (8 atm to about 15 atm). In embodiments, vessel 10 is operated at or near atmospheric pressure.

Multiple High Shear Mixing Devices. In some embodiments, two or more high shear devices like HSD 40, or configured differently, are aligned in series, and are used to further enhance the reaction. Their operation may be in either batch or continuous mode. In some instances in which a single pass or "once through" process is desired, the use of multiple high shear devices in series may also be advantageous. For example, in embodiments, outlet dispersion in line 18 may be fed into a second high shear device. When multiple high shear devices 40 are operated in series, additional oxidant gas may be injected into the inlet feedstream of each high shear device. In some embodiments, multiple high shear devices 40 are operated in parallel, and the outlet dispersions therefrom are introduced into one or more vessel 10.

Features. The application of enhanced mixing of the reactants by HSD 40 potentially permits efficient regeneration of liquid catalyst. In some embodiments, the enhanced mixing potentiates an increase in throughput of the process stream. In some embodiments, the high shear mixing device is incorporated into an established process, thereby enabling an increase in production (i.e., greater throughput). In contrast to some methods that attempt to increase the regeneration by larger volume oxidizers, the superior dispersion and contact provided by external high shear mixing may allow in many cases a decrease in the size and/or residence time in vessel 10 while maintaining or even increasing desulfurization rate. Without wishing to be limited to a particular theory, it is believed that the level or degree of high shear mixing is sufficient to increase rates of mass transfer and may also produce localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods induces cavitation whereby oxidant and reduced liquid catalyst are dissociated into free radicals, which then react to regenerate the catalyst.

In some embodiments, the system and methods described herein permit design of a smaller and/or less capital intensive process than previously possible without the use of external high shear device 40. Potential advantages of certain embodiments of the disclosed methods are reduced operating costs and increased production from an existing process. Certain embodiments of the disclosed processes additionally offer the advantage of reduced capital costs for the design of new processes. In embodiments, dispersing oxidant gas in liquid comprising reduced liquid catalyst with high shear device 40 decreases the amount of unoxidized liquid catalyst. Potential benefits of some embodiments of this system and method for gas sweetening include, but are not limited to, faster cycle times, increased throughput, reduced operating costs and/or reduced capital expense due to the possibility of designing smaller oxidizers 10 or replacing an oxidizer with a separation vessel 10 and/or operating the process at lower temperature and/or pressure.

In embodiments, use of the disclosed process comprising reactant mixing via external high shear device 40 allows use of less oxidant in vessel/reactor 10 than previously permitted. In embodiments, the method comprises incorporating external high shear device 40 into an established process thereby reducing the operating temperature and/or pressure of the reaction in external high shear device 40 and/or enabling the increase in production (greater throughput) from a process operated without high shear device 40. In embodiments, vessel 10 is used mainly for separation of sulfur slurry from liquid catalyst, as much of the oxidation of catalyst occurs in external high shear device 40. In embodiments, most of the regeneration oxidation reaction occurs within the external high shear device 40.

The present methods and systems for gas sweetening via oxidation with liquid phase catalyst and regeneration of reduced catalyst by oxidation employ an external high shear mechanical device to provide rapid contact and mixing of chemical ingredients in a controlled environment in the high shear device. The high shear device reduces the mass transfer limitations on the reaction and thus increases the overall reaction rate, and may allow substantial oxidation of catalyst under global operating conditions under which substantial reaction may not be expected to occur.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for removing hydrogen sulfide from a sour gas stream comprising hydrogen sulfide, the method comprising:

oxidizing hydrogen sulfide in a converter by contacting the sour gas stream with an aqueous catalytic solution, thereby producing a desulfurized gas stream and a liquid stream comprising reduced catalyst and elemental sulfur;

introducing an oxidant and the liquid stream comprising reduced catalyst and elemental sulfur into an external high shear device and producing a dispersion wherein the mean bubble diameter of the oxidant gas in the dispersion is less than about 5 μm;

introducing the dispersion into a vessel from which a sulfur-containing slurry is removed and a regenerated catalyst stream is removed, wherein the sulfur slurry comprises elemental sulfur and aqueous solution; and recycling at least a portion of the regenerated catalyst stream to the converter, wherein the external high shear device is external to the converter and to the vessel.

2. The method of claim 1 further comprising removing at least a portion of the aqueous solution from the sulfur-containing slurry and recycling at least a fraction thereof to the vessel.

3. The method of claim 1 wherein the vessel is an oxidizer comprising spargers whereby additional oxidant gas is introduced into the vessel.

4. A method for sweetening a sour gas stream, the method comprising:

forming a dispersion in an external high shear device located downstream from an absorber, wherein the dispersion comprises oxidant gas bubbles dispersed in a liquid phase comprising reduced redox liquid catalyst and wherein the bubbles have a mean diameter of less than 1 micron; and introducing the dispersion into a vessel configured for settling and removal of a sulfur slurry from a bottom section thereof.

5. The method of claim 4 wherein the gas bubbles have a mean diameter of less than 400 nm.

6. The method of claim 4 wherein the gas bubbles have a mean diameter of no more than 100 nm.

7. The method of claim 4 wherein the sour gas comprises a gas selected from the group consisting of air, natural gas, carbon dioxide, amine acid gas, landfill gas, biogas, synthesis gas, geothermal gas, refinery gas, and combinations thereof.

8. The method of claim 4 wherein forming the dispersion comprises subjecting a mixture of the oxidant gas and the liquid catalytic phase to a shear rate of greater than about $20,000\ s^{-1}$.

9. The method of claim 4 wherein forming the dispersion comprises contacting the oxidant gas and the liquid catalytic phase in a high shear device, wherein the high shear device comprises at least one rotor, and wherein the at least one rotor is rotated at a tip speed of at least 22.9 m/s (4,500 ft/min) during formation of the dispersion.

10. The method of claim 9 wherein the high shear device produces a local pressure of at least about 1034.2 MPa (150,000 psi) at the tip of the at least one rotor.

11. The method of claim 9 wherein the energy expenditure of the high shear device is greater than $1000\ W/m^3$.

12. The method of claim 4 wherein the redox catalyst is selected from organometallics and iron chelate catalysts.

13. A method for removing hydrogen sulfide from sour gas, the method comprising:

oxidizing hydrogen sulfide gas by contacting the sour gas with a liquid comprising an oxidized catalyst in a converter to produce a converter liquid product stream comprising sulfur and reduced catalyst;

forming a fluid mixture comprising the converter liquid product stream and oxidant gas;

introducing the fluid mixture into an external high shear device wherein the fluid mixture is exposed to a shear rate of at least about $20,000\ s^{-1}$ to produce a dispersion of oxidant in a continuous phase of the liquid; and introducing the dispersion into a vessel from which a sulfur slurry is removed and from which a liquid stream comprising regenerated oxidized liquid catalyst is recycled to the converter.

14. The method of claim 13 further comprising:

introducing the sulfur slurry to a separator from which aqueous liquid in the slurry is removed from the sulfur; and recycling the aqueous liquid removed from the slurry to the vessel.

15. The method of claim 13 wherein the average bubble diameter of the oxidant gas in the dispersion is less than 1 μm.

16. The method of claim 13 wherein the dispersion is stable for at least about 15 minutes at atmospheric pressure.

17. The method of claim 13 wherein exposing the fluid mixture to a shear rate of greater than about $20,000\ s^{-1}$ comprises introducing the fluid into a high shear device comprising at least two generators.

* * * * *